(12) United States Patent
Lopez Nieto et al.

(10) Patent No.: US 9,013,979 B2
(45) Date of Patent: Apr. 21, 2015

(54) HIGH-AVAILABLE POLICY AND CHARGING-CONTROL IN GEOGRAPHICAL REDUNDANCY PCRF CONFIGURATIONS

(75) Inventors: Ana Maria Lopez Nieto, Madrid (ES); Leticia Ruiz Martin, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 171 days.

(21) Appl. No.: 13/581,729

(22) PCT Filed: Mar. 2, 2010

(86) PCT No.: PCT/IB2010/000428
§ 371 (c)(1),
(2), (4) Date: Aug. 29, 2012

(87) PCT Pub. No.: WO2011/107813
PCT Pub. Date: Sep. 9, 2011

(65) Prior Publication Data
US 2013/0003529 A1 Jan. 3, 2013

(51) Int. Cl.
*G06F 11/14* (2006.01)
*H04L 12/14* (2006.01)
*G06F 11/20* (2006.01)

(52) U.S. Cl.
CPC ............ *H04L 12/14* (2013.01); *G06F 11/2038* (2013.01); *G06F 11/2097* (2013.01); *H04L 12/1403* (2013.01)

(58) Field of Classification Search
None
See application file for complete search history.

(56) References Cited

U.S. PATENT DOCUMENTS

| 7,715,308 | B2 * | 5/2010 | Ramaswamy | 370/217 |
| 2006/0126501 | A1 * | 6/2006 | Ramaswamy | 370/221 |
| 2007/0036312 | A1 * | 2/2007 | Cai et al. | 379/126 |
| 2010/0220656 | A1 * | 9/2010 | Ramankutty et al. | 370/328 |

(Continued)

OTHER PUBLICATIONS

International Search Report for PCT/IB2010/000428, mailed Jun. 14, 2010.

(Continued)

*Primary Examiner* — Michael J Moore, Jr.
*Assistant Examiner* — Ayanah George
(74) *Attorney, Agent, or Firm* — Baker Botts, LLP (57) ABSTRACT

The present invention is related to handling redundancy of a Policy and Charging Rules Function (PCRF) in a wireless communication network having an active PCRF, a standby PCRF and a Policy and Charging Enforcement Function (PCEF) by replicating accumulative quota usage of the active PCRF in a memory of the standby PCRF every time an update request is received at the active PCRF. The present invention is directed to a Policy and Charging Rules Function (PCRF) active in a wireless communication network having a standby PCRF and a Policy and Charging Enforcement Function (PCEF), wherein the PCRF includes a memory in which accumulative quota usage is stored. The PCRF includes a network interface unit which receives update requests. The PCRF includes a processing unit which produces a message having the accumulative quota usage from the memory and that is sent to the standby PCRF from the network interface unit every time an update request is received by the network interface unit so the standby PCRF can become an active PCRF when a switchover is required. The present invention is also directed to a method for handling redundancy of a Policy and Charging Rules Function (PCRF) in a wireless communication network having an active PCRF, a standby PCRF and a Policy and Charging Enforcement Function (PCEF).

10 Claims, 5 Drawing Sheets

(56) References Cited

U.S. PATENT DOCUMENTS

2011/0044353 A1* 2/2011 Foottit et al. .................. 370/465
2012/0096177 A1* 4/2012 Rasanen ....................... 709/228
2012/0320801 A1* 12/2012 Yang et al. .................... 370/259

OTHER PUBLICATIONS

Cisco Systems, Inc., "Cisco Content Services Gateway—2nd Generation Release 3.5 Installation and Configuration Guide", http://www.cisco.com/en/US/docs/wireless/csg2/3.5/installation/guide/csg3-51.pdf, (Jun. 5, 2009), 22 pages.

"Universal Mobile Telecommunications System (UMTS); LTE; Policy and charging control over Gx reference point (3GPP TS 29.212 version 9.1.0 Release 9)", Technical Specification, European Telecomunications Standards Institute (ETSI), (Jan. 1, 2010).

Nokia Siemens Networks: "IP-CAN Session termination", vol. CT WG3, (Jan. 18, 2008).

"Digital Cellular Telecommunications System (Phase 2+); Universal Mobile Telecommunications System (UMTS); LTE; Policy and charging control architecture (3GPP TS 23.203 version 9.3.0 Release 9)", Technical Specification, EP Telecommunications Standards Institute, (Jan. 1, 2010).

ETSI TS 129 212 V7 4.0; Universal Mobile Telecommunications System (UMTS); Policy and charging control over Gx reference point (3GPP TS 29.212 version 7.4.0 Release 7), 2008.

3GPP TS 29.210 V6 7.0; 3rd Generation Partnership Project; Technical Specification Group Core Network and Terminals; Charging rule provisioning over Gx interface (Release 6), 2006.

3GPP TS 23.203 V8 3.1; 3rd Generation Partnership Project; Technical Specification Group Services and System Aspects; Policy and charging control architecture (Release 8), 2008.

* cited by examiner

HIGH-AVAILABLE POLICY AND CHARGING-CONTROL IN GEOGRAPHICAL REDUNDANCY PCRF CONFIGURATIONS

This application is the U.S. national phase of International Application No. PCT/IB2010/000428, filed 2 Mar. 2010, which designated the U.S., the entire contents of which is hereby incorporated by reference.

TECHNICAL FIELD

The present invention is related to handling redundancy of a Policy and Charging Rules Function (PCRF) in a wireless communication network having an active PCRF, a standby PCRF and a Policy and Charging Enforcement Function (PCEF). (As used herein, references to the "present invention" or "invention" relate to exemplary embodiments and not necessarily to every embodiment encompassed by the appended claims.) More specifically, the present invention is related to handling of operational data to support redundancy of a Policy and Charging Rules Function (PCRF) in said wireless communication network and then performing a switchover from the active PCRF to the standby PCRF, when the active PCRF fails, so that the standby PCRF becomes the active PCRF.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Figure 1:
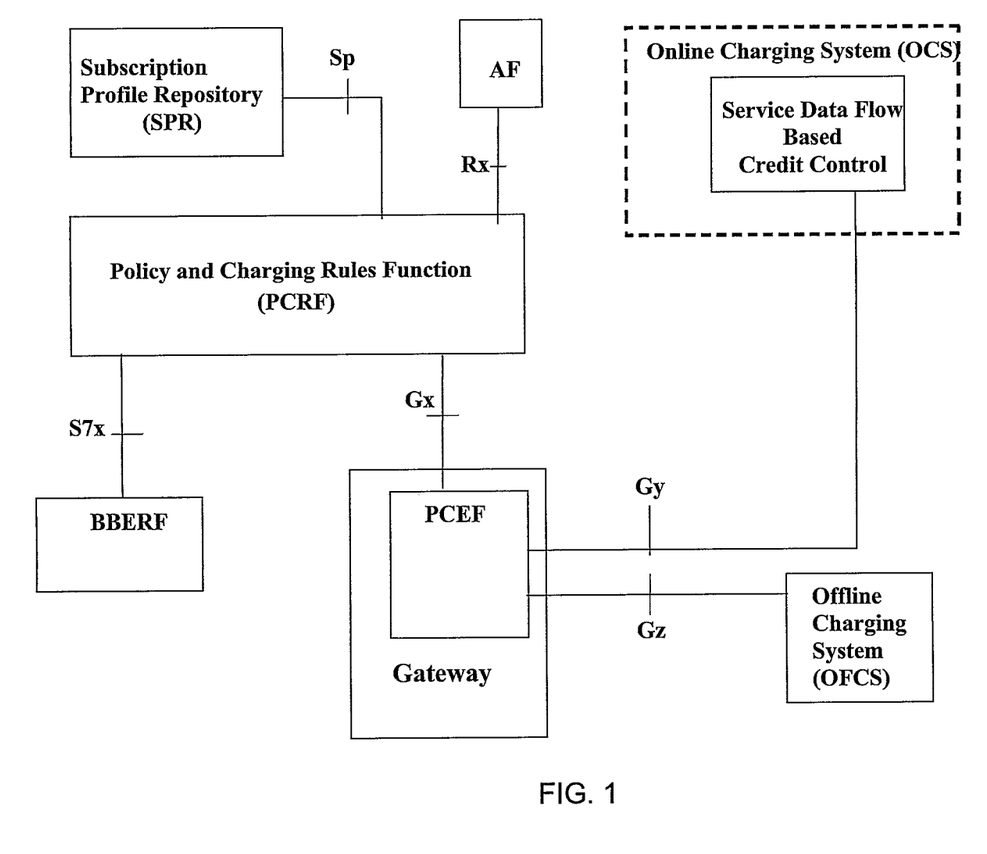
FIG. 1 shows a policy and charging control architecture.

Policy and Charging Control (PCC) architecture permits to integrate both policy and charging control. The architecture that supports Policy and Charging Control functionality is shown in FIG. 1. FIG. 1 has been taken from TS 23.203 (V.8.3.1) that specifies the PCC functionality for Evolved 3GPP Packet Switched domain, including both 3GPP accesses (GERAN/UTRAN/E-UTRAN) and Non-3GPP accesses. FIG. 1 shows a policy and charging control architecture.

SAPC (Ericsson realization of PCRF) supports an extension of 3GPP Gx protocol, called Gx+ that includes among other functionalities an additional policy control based on accumulated usage (Fair Usage Control). Fair Usage Control functionality allows changing the QoS setting or other settings such as service authorization information per subscriber based on actual use in terms of volume, time and events with reference to specific subscriber quotas. It also permits to change the QoS on a session in progress. The Fair Usage Control functionality is based on two functions:

Control of reporting function: PCRF indicates to PCEF when the reporting of usage is to be done, this is done by setting "quotas". PCRF indicates to PCEF a "quota" for volume and/or time. When one of these quotas is empty PCEF reports the usage for all the reporting groups that are active for the IP-CAN session since the last report and also the usage for the entire IP-CAN session since the last report.

The reported usage is accumulated in PCRF per reporting group and a total usage. PCRF uses this accumulated usage to perform the Control Actions.

Control Actions: The control actions are the result of the policy evaluation of types Access & Charging Control and/or QoS Control in PCRF.

Figure 2:
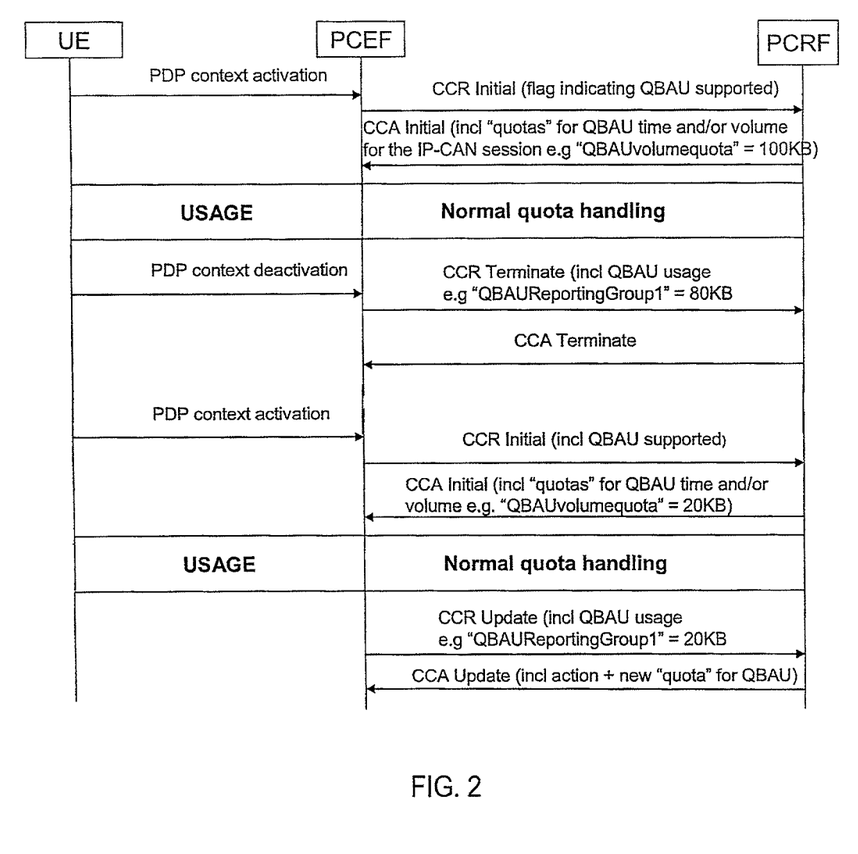
FIG. 2 shows Fair Usage Control use case message flow.
Figure 3:
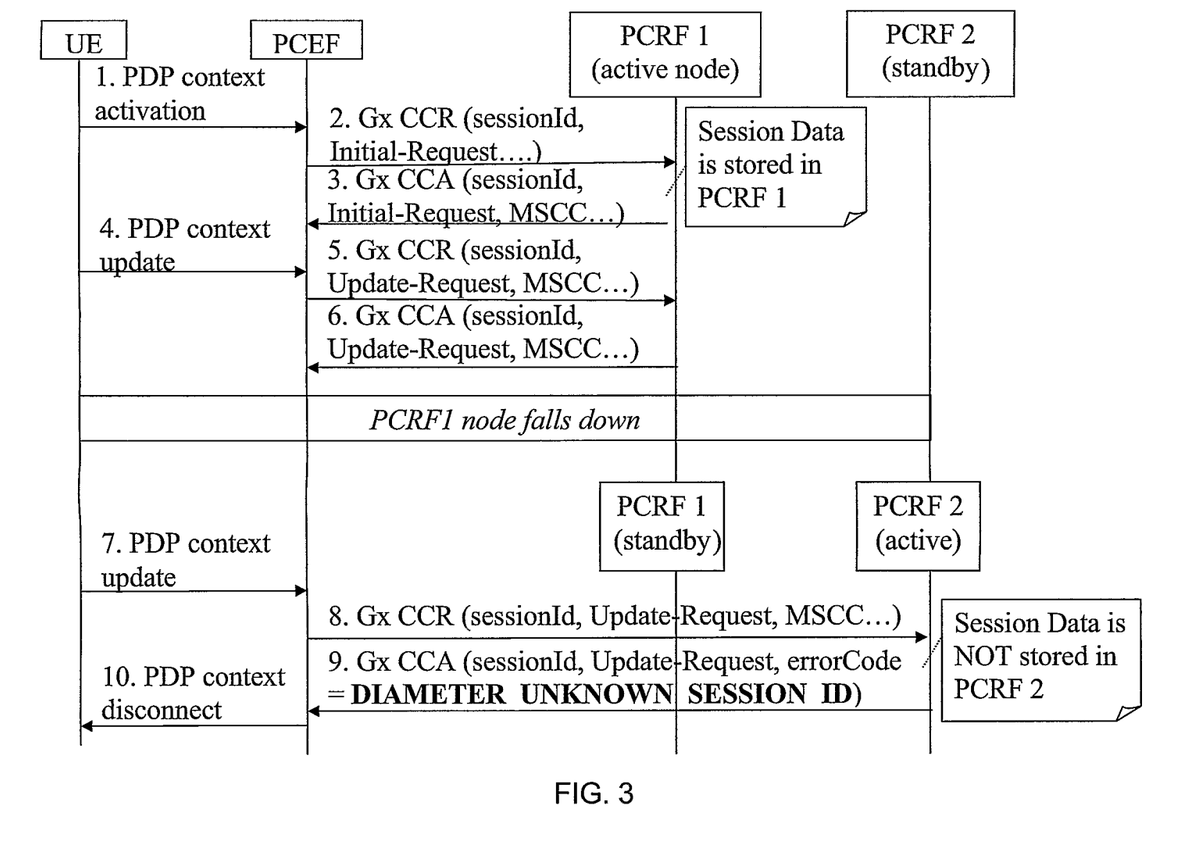

FIGS. 2 and 3 show some use cases for QBAU functionality. FIG. 2 shows Fair Usage Control use case message flow.

When PCRF is working in a Geographical Redundancy configuration, there are two PCRF nodes, one is the "active" node (PCRF1) and the other is the "standby" node (PCRF2). The active node is the entry point of PCEF requests, and the standby node maintains its local database updated with replicated data from the active node. When the "active" node fails (PCRF1) the node that is in standby (PCRF2) starts to give service and becomes the "active" node. This is called a switch-over.

One problem in current solution in PCRF Geographical Redundancy (hereinafter GeoRed) configuration is that the standby zone is not aware of the usage accumulated in the active zone. For this reason, when the standby zone starts giving service, the quota information provided to the user is not updated.

An additional and more important problem in PCRF Geo-Red configuration is that the standby zone is not aware of IP-CAN session data in the active zone. This means that if PCRF1 is giving service to the PCEF and it suffers a fail-over to PCRF2, when PCRF2 receives an authorization request from the PCEF, the request would be rejected because PCRF2 does not have information regarding the IP-CAN session that was established with the PCRF1. The consequence of rejecting the request is that the IP-CAN session is deactivated or that the PCEF uses local policies for the IP-CAN session. Both alternatives have a negative effect on the operator needs and the user experience. FIG. 3 depicts this problem with more detail. FIG. 3 shows handling unknown sessions in PCRF GeoRed configuration.

In steps 1-6 the PCEF has a running IP-CAN session established with the PCRF1. If PCRF1 fails, the PCRF2 takes the control.

If a CCR-Update message corresponding to this previously established IP-CAN session is received in PCRF2, as this node ignores the IP-CAN session data, the received sessionId in CCR-Update is unknown for the node, and PCRF2 returns the error code DIAMETER_UNKNOWN_SESSION_ID in the answer message.

Accordingly, a standby PCRF becoming active PCRF in GeoRed configuration can not provide an effective policy and charging control based on accumulated usage. PCEF node receives an error code for an established session, and consequently PCEF stops serving the user session. It should be noted that MSCC is the AVP used to report usage in CCR messages, and quota assigned in CCA messages.

SUMMARY

The present invention pertains to a Policy and Charging Rules Function (PCRF) active in a wireless communication network having a standby PCRF and a Policy and Charging Enforcement Function (PCEF). The PCRF comprises a memory in which accumulative quota usage is stored. The PCRF comprises a network interface unit which receives update requests. The PCRF comprises a processing unit which produces a message having the accumulative quota usage from the memory and that is sent to the standby PCRF from the network interface unit every time an update request is received by the network interface unit so the standby PCRF can become an active PCRF when a switchover is required.

The present invention pertains to a method for handling redundancy of PCRF in a wireless communication network having an active PCRF, a standby PCRF and a PCEF. The method comprises the steps of replicating accumulative quota usage of the active PCRF in a memory of the standby PCRF every time an update request is received at a network interface unit of the active PCRF. There is the step of performing a switchover from the active PCRF to the standby PCRF, when the active PCRF fails, so that the standby PCRF becomes the active PCRF.

The present invention pertains to a method for handling redundancy of a PCRF in a wireless communication network having an active PCRF, a standby PCRF and a PCEF. The method comprises the steps of configuring the standby PCRF with default information needed to create an IP Connectivity Access Network (IP-CAN) session. The default information includes specific capabilities supported by each PCEF. There are the steps of receiving at the active PCRF from a PCEF an initial request to establish a session for a user. There is the step of replicating accumulated quota usage from the active PCRF towards the standby PCRF. There is the step of receiving at the active PCRF from the PCEF an update request for a session already established for the user. There is the step of replicating the accumulated quota usage from the active PCRF towards the standby PCRF. Upon failure of the active PCRF, there is the step of receiving at the standby PCRF from the PCEF an update request for a session already established for the user. There is the step of creating at the standby PCRF an IP-CAN session with the information received in the update request and taking into account the accumulated quota usage for the user previously replicated. There is the step of answering the update request towards the PCEF as an implicit confirmation of switch-over and the standby PCRF becoming the new active PCRF.

BRIEF DESCRIPTION OF THE DRAWINGS

In the accompanying drawings, the preferred embodiment of the invention and preferred methods of practicing the invention are illustrated in which:

FIG. 3 shows handling unknown sessions in PCRF Geo-Red configuration.

DETAILED DESCRIPTION

Figure 5:
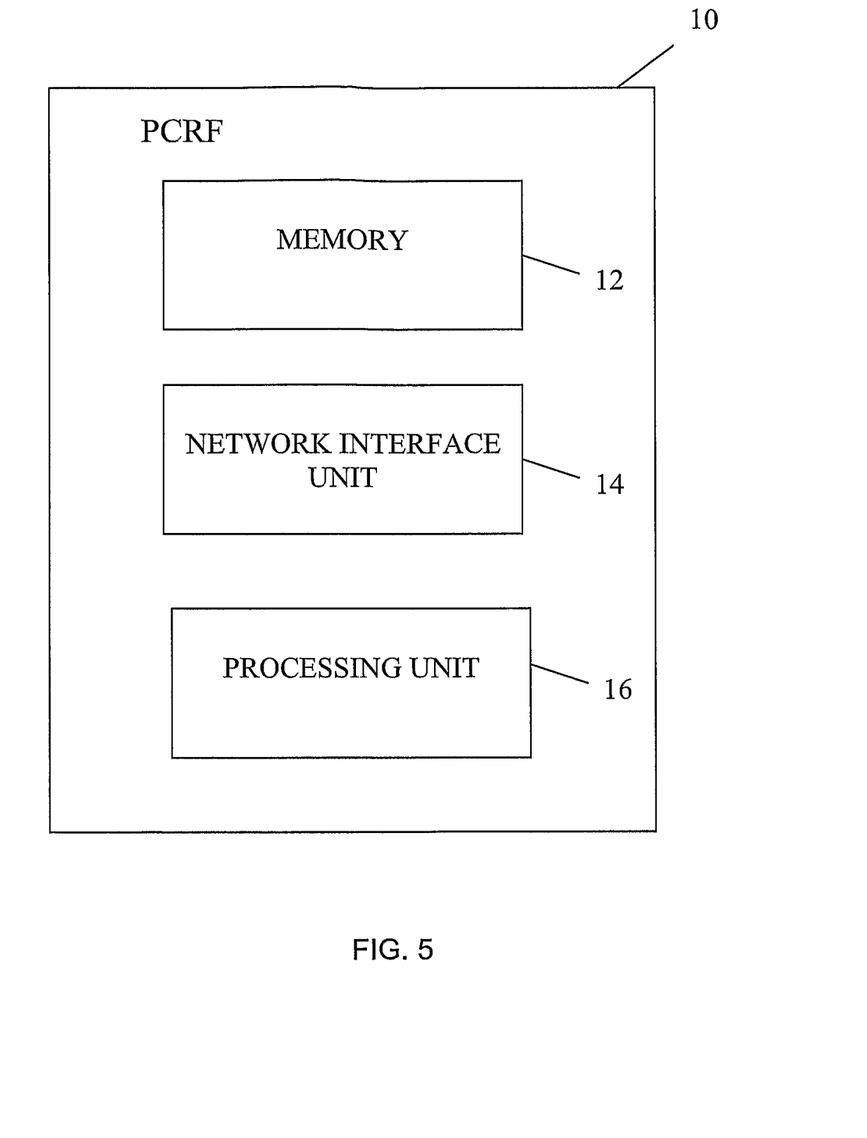
FIG. 5 is a block diagram of a PCRF of the present invention.

Referring now to the drawings wherein like reference numerals refer to similar or identical parts throughout the several views, and more specifically to FIG. 5 thereof, there is shown a PCRF 10, which is adapted to act as an active PCRF 10A and as a standby PCRF 10B in a wireless communication network having an active PCRF, a standby PCRF and a PCEF. The PCRF 10, as an active PCRF 10A, comprises a memory 12 in which accumulative quota usage is stored. An active PCRF 10A comprises a network interface 14 unit which receives update requests. The active PCRF 10A comprises a processing unit 16 which produces a message having the accumulative quota usage from the memory 12 and that is sent to the standby PCRF 10B from the network interface 14 unit every time an update request is received by the network interface 14 unit so the standby PCRF 10 can become an active PCRF 10 when a switchover is required. It should be noted that the PCRF 10, as a standby PCRF 10B, also has the elements as shown in FIG. 5.

When an update request for a session that does not exist in the PCRF 10A, 10B is received by the network interface 14, the processing unit 16 of the PCRF 10A, 10B may create an IP Connectivity Access Network (IP-CAN) session with information received in the update request. The network interface 14 unit may receive update requests at the network interface 14 unit from the PCEF. The processing unit 16 may use default information in the memory 12, the default information including specific features or capabilities supported by the PCEF. The processing unit 16 may use the default information preconfigured in the memory 12, what permits to know what policy controls to execute for the PCEF.

The present invention pertains to a method for handling redundancy of a PCRF 10 in a wireless communication network having an active PCRF 10A, a standby PCRF 10B and a PCEF. The method comprises the steps of replicating accumulative quota usage of the active PCRF 10A in a memory 12 of the standby PCRF 10B every time an update request is received at a network interface 14 unit of the active PCRF 10A. There is the step of performing a switchover from the active PCRF 10A to the standby PCRF 10B, when the active PCRF 10A fails, so that the standby PCRF 10B becomes the active PCRF 10A.

There may be the steps of receiving an update request for a session that does not exist in the PCRF 10A, 10B, and creating with a processing unit 16 of the PCRF 10A, 10B an IP-CAN session with information received in the update request. There may be the step of receiving update requests from the PCEF via the network interface 14 unit. The creating step may include the step of using default information in the memory 12 by the processing unit 16, the default information including specific features or capabilities supported by the PCEF. The creating step may include the step of using the default information preconfigured in the memory 12 and the latter step permits to know what policy controls to execute for the PCEF.

The present invention pertains to a method for handling redundancy of a PCRF 10 in a wireless communication network having an active PCRF 10A, a standby PCRF 10B and PCEF. The method comprises the steps of configuring the standby PCRF 10B with default information needed to create an IP-CAN session. The default information includes specific capabilities supported by each PCEF. There is the step of receiving at the active PCRF 10A from a PCEF an initial request to establish a session for a user. There is the step of replicating accumulated quota usage from the active PCRF 10A towards the standby PCRF 10B. There is the step of receiving at the active PCRF 10A from the PCEF an update request for a session already established for the user. There is the step of replicating the accumulated quota usage from the active PCRF 10A towards the standby PCRF 10B. Upon failure of the active PCRF 10A, there is the step of receiving at the standby PCRF 10B from the PCEF an update request for a session already established for the user. There is the step of creating at the standby PCRF 10B an IP-CAN session with the information received in the update request and taking into account the accumulated quota usage for the user previously replicated. There is the step of answering the update request towards the PCEF as an implicit confirmation of switch-over and the standby PCRF 10B becoming the new active PCRF 10A.

There may be the steps of receiving an update request for a session that does not exist in the PCRF 10, and creating with a processing unit 16 of the PCRF 10 an IP Connectivity Access Network (IP-CAN) session with information received in the update request. In principle, this PCRF 10 may be presumed to be the standby PCRF 10B, though nothing in this specification precludes the active PCRF 10A being thus configured so as create such IP-CAN session in order to save unexpected behaviors with help of the default information preconfigured therein. The creating step may include the step of using default information in the memory 12 by the processing unit 16, the default information including specific features or capabilities supported by the PCEF. The creating step may include the step of using the default information preconfigured in the memory 12 thus permitting to know what policy controls to execute for the PCEF.

In the operation of the invention, the proposal of the current invention is to solve the problem exposed before. That is, although IP-CAN session data could not be replicated in a GeoRed configuration due to cost and performance issues, PCRF 10 shall still perform policy and charging control and policy control based on accumulated usage in a switch-over scenario. In order to achieve that two mechanisms are proposed:

1. Replication of those data necessary to perform policy and charging control and policy control based on accumulated usage on the standby PCRF 10B. This data may include at least: policies, accumulated usage and other configuration data.

2. Recovery of IP-CAN session information from the re-authorization messages (CCR update and CCR Terminate) in case there is not an existing IP-CAN session in the PCRF 10B. That is, create the unknown session, prior to process the messages when the sessionId of the message is unknown.

Current solutions create the IP-CAN session at initial request. In accordance with this specification, however, also the update and terminate requests can be used to create the IP-CAN session, when this is unknown for the PCRF 10, 10A and 10B.

By these two mechanisms, PCRF 10 in a GeoRed configuration should still provide policy and charging control and policy control based on accumulated usage in a switch-over scenario in a transparent way. The PCEF node should not know that the active node has failed and the standby node has taken the "active" role. The GeoRed switch-over should be transparent to the PCEF node, and consequently the user session should not be disconnected.

As is shown in FIG. 3, the current GeoRed solution in the PCRF does not provide policy and charging control and policy control based on accumulated usage in a switch-over situation.

Figure 4:
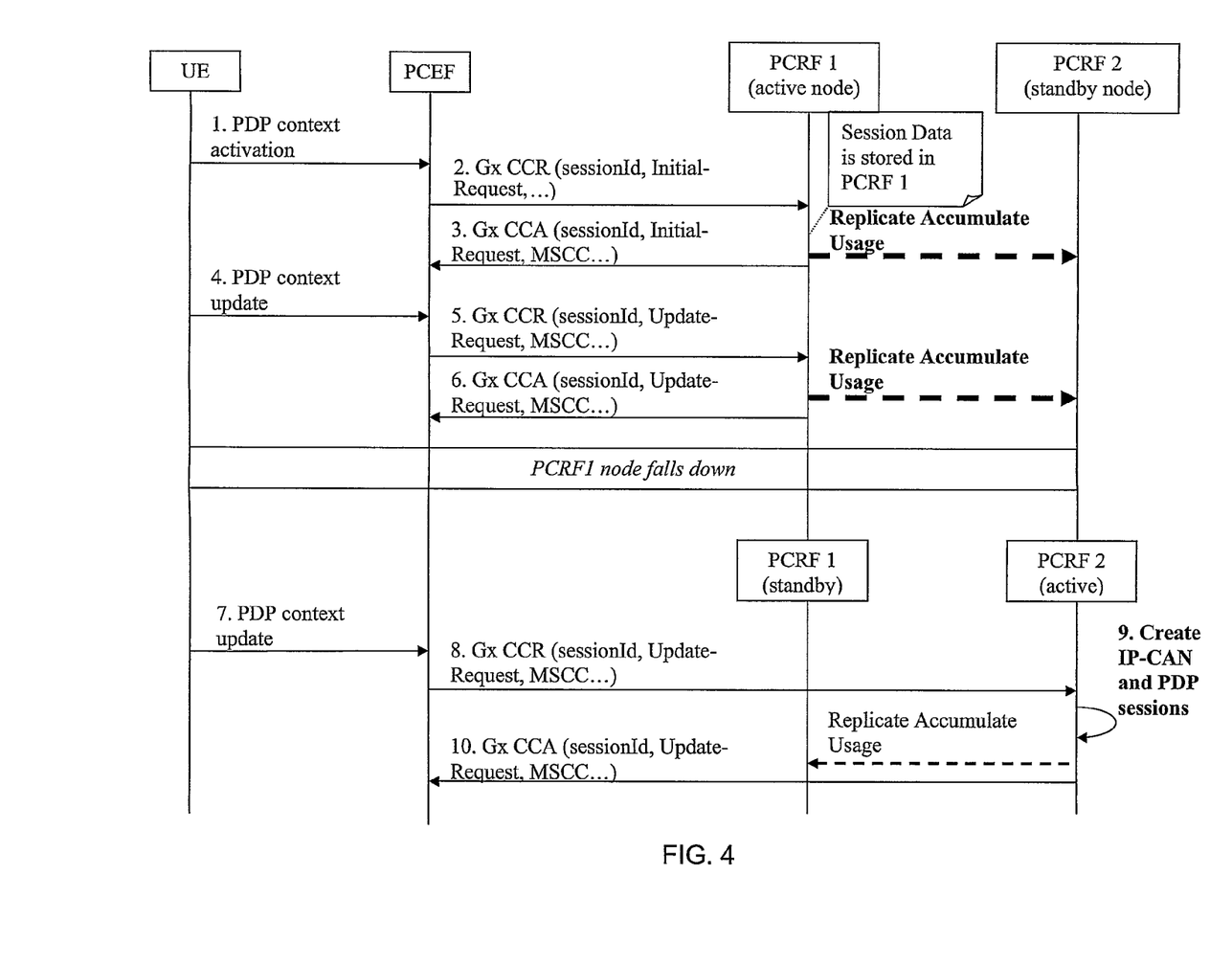
FIG. 4 shows solving the problem of unknown sessions in PCRF GeoRed configuration.

The solution of this problem provides for replicating the accumulated data in the standby node and creating the IP-CAN session information with the re-authorization requests messages received from the PCEF when the sessionId of these messages is unknown for PCRF 10A, 10B. A more detailed description is shown in FIG. 4. FIG. 4 shows solving the problem of unknown sessions in PCRF 10 GeoRed configuration.

Before a switch-over occurs, the active PCRF 10A replicates the accumulated usage in the standby PCRF 10B every time a re-authorization request (CCR update) is received from the PCEF. In addition, if there is a switch-over and a CCR update is received for a session that does not exist in PCRF 10B, PCRF 10B creates the IP-CAN session with the information received in the CCR update. In order to do that, PCRF 10B needs some default information to create the IP-CAN session such as specific features or capabilities supported by the PCEF. This information is preconfigured in the PCRF 10A, 10B and permits to know what policy controls to execute for the specific PCEF (e.g. if QoS control, content filtering control etc are supported by the PCEF).

A particular variation for this invention consists in neither creating the IP-CAN session nor the PDP session for the CCR-Terminate case, just processing the message without creating the session, as these sessions will be deleted at the end of the processing. There is no impact in the PCEF as the switch-over is transparent to the PCEF.

In regard to the impacts in the PCRF 10:
The active PCRF 10A replicates the accumulated usage in the stand-by PCRF 10B in a GeoRed configuration.
The PCRF 10A, 10B creates the IP-CAN session at CCR update in addition to the creation of the IP-CAN session at CCR initial that is the standard mechanism.
The PCRF 10A, 10B has preconfigured information of what capabilities each PCEF supports.
There are no significant impacts on the Gx reference point.
In regard to advantages of the invention:
The main advantage of the present invention is to solve the problem of PCRF 10 GeoRed configuration. With this invention one may have the two PCRF 10A, 10B nodes of the GeoRed configuration (active and standby) shown to PCEF as a single up node, although IP-CAN session data is not replicated.
The present invention provides an alternative solution to the replication of IP-CAN session in PCRF GeoRed configuration which was discarded due to the great impact in terms of cost and performance.
Another advantage of the present invention is the possibility of still performing policy control based on accumulated usage, without losing the user session and the accumulated data, after a switch over in PCRF 10 GeoRed configuration, as the CCR messages with an unknown session are still processed.

Abbreviations

AF Application Function
AVP Added Value Pair
BBERF Bearer Binding and Event Reporting Function
BW Bandwidth
CCA Credit Control Answer
CCR Credit Control Request
GeoRed Geographical Redundancy
GPRS General Packet Radio Service
IP-CAN IP Connectivity Access Network
MSCC Multiple Services Credit Control
OCS Online Charging System
OFCS Offline Charging System
P2P Peer to Peer
PCC Policy and Charging Control
PDP Packet Data Protocol
PCEF Policy and Charging Enforcement Function
PCRF Policy and Charging Rules Function
QBAU Quality of service Based on Accumulated Usage
QoS Quality of Service
SAPC Service Aware Policy Controller
SPR Subscription Profile Repository
UE User Equipment Concepts

| Concept | Definition |
|---|---|
| IP-CAN bearer | IP transmission path of defined capacity, delay, bit error rate, etc. An IP-CAN bearer in GPRS is a PDP context. |

-continued

| Concept | Definition |
|---|---|
| IP-CAN session | Association between a UE and an IP network. The association is identified by a UE IP address together with a UE identity information, if available. An IP-CAN session incorporates one or more IP-CAN bearers. Support for multiple IP-CAN bearers per IP-CAN session is IP-CAN specific. An IP-CAN session exists as long as the UE IP address is established and announced to the IP network. |
| Quota | A quota in the context of this document is a value that is transferred from PCRF towards PCEF that indicates the available volume and/or time at IP-CAN session level. |
| Reporting Group | A Reporting Group is a group of services defined for reporting purposes in the QBAU functionality. It may also refer to an individual service if the granularity of service level is needed. A reporting group can be for example P2P. |

Although the invention has been described in detail in the foregoing embodiments for the purpose of illustration, it is to be understood that such detail is solely for that purpose and that variations can be made therein by those skilled in the art without departing from the scope of the invention except as it may be described by the following claims.

The invention claimed is:

1. A method for handling redundancy of a Policy and Charging Rules Function (PCRF) in a wireless communication network having an active PCRF, a standby PCRF and a Policy and Charging Enforcement Function (PCEF), the method comprising the steps of:
   receiving at the active PCRF from the PCEF an initial request to establish an IP Connectivity Access Network (IP-CAN) session for a user;
   receiving at the active PCRF from the PCEF an update request for the IP-CAN session already established for the user;
   replicating accumulated quota usage from the active PCRF towards the standby PCRF in response to receiving the update request;
   upon failure of the active PCRF, receiving at the standby PCRF from the PCEF a further update request for the IP-CAN session previously established for the user at the active PCRF;
   creating at the standby PCRF a corresponding IP-CAN session for the user with information received in the further update request and taking into account the accumulated quota usage previously replicated for the user;
   performing a switchover from the active PCRF to the standby PCRF, so that the standby PCRF becomes a new active PCRF; and
   answering the further update request from the new active PCRF towards the PCEF as an implicit confirmation of the switchover.

2. The method of claim 1, wherein the method comprises configuring the standby PCRF with default information to create the corresponding IP-CAN session, the default information including specific features or capabilities supported by the PCEF to enforce specific policy controls.

3. The method of claim 2 wherein creating the corresponding IP-CAN session comprises using the default information configured in the standby PCRF to determine policy controls to execute for the PCEF in the corresponding IP-CAN session.

4. The method of claim 1 wherein the accumulated quota usage indicates a volume and/or time already used at IP-CAN session level from an available volume and/or time at IP-CAN session level.

5. A standby Policy and Charging Rules Function (standby PCRF) server of an active Policy and Charging Rules Function (active PCRF) server in a wireless communication network which includes a Policy and Charging Enforcement Function (PCEF) device, the standby PCRF server comprising:
   a network interface unit configured to receive an accumulated quota usage from the active PCRF server;
   a memory configured to replicate the accumulated quota usage received;
   wherein the network interface unit is configured to receive from the PCEF device, upon failure of the active PCRF server, an update request for an IP Connectivity Access Network (IP-CAN) session previously established for the user at the active PCRF server;
   a processing unit adapted to create a corresponding IP-CAN session for the user with information received in the update request and taking into account the accumulated quota usage replicated in the memory, so that the standby PCRF server becomes a new active PCRF server; and
   wherein the network interface unit is configured to answer the update request towards the PCEF device as an implicit confirmation of switchover and of the standby PCRF server becoming the new active PCRF server.

6. The standby PCRF server of claim 5, wherein the memory is configured with default information which the processing unit is adapted to use in order to create the corresponding IP-CAN session.

7. The standby PCRF server of claim 6, wherein the default information includes specific features or capabilities supported by the PCEF device to enforce specific policy controls, and wherein the processing unit uses the specific features or capabilities supported by the PCEF to determine policy controls to execute for the PCEF in the corresponding IP-CAN session.

8. The standby PCRF server of claim 5 wherein the accumulated quota usage indicates a volume and/or time already used at IP-CAN session level from an available volume and/or time at IP-CAN session level.

9. An active Policy and Charging Rules Function (active PCRF) server in a wireless communication network having a standby Policy and Charging Rules Function (standby PCRF) server and a Policy and Charging Enforcement Function (PCEF) device, the active PCRF server comprising:
   a memory configured to store an accumulated quota usage;
   a network interface unit configured to receive from the PCEF device an initial request to establish an IP Connectivity Access Network (IP-CAN) session for a user and an update request for the IP-CAN session already established for the user;
   a processing unit configured to produce, responsive to the update request, a message including the accumulated quota usage retrieved from the memory; and
   wherein the network interface unit is configured to send said message to the standby PCRF server so the standby PCRF server is enabled to become a new active PCRF server when a switchover is required.

10. The active PCRF of claim 9 wherein the accumulated quota usage indicates a volume and/or time already used at IP-CAN session level from an available volume and/or time at IP-CAN session level.

* * * * *

UNITED STATES PATENT AND TRADEMARK OFFICE
CERTIFICATE OF CORRECTION

| | | |
|---|---|---|
| PATENT NO. | : 9,013,979 B2 | Page 1 of 1 |
| APPLICATION NO. | : 13/581729 | |
| DATED | : April 21, 2015 | |
| INVENTOR(S) | : Lopez Nieto et al. | |

It is certified that error appears in the above-identified patent and that said Letters Patent is hereby corrected as shown below:

Claims

In Column 8, Line 17, in Claim 5, delete "adapted" and insert -- configured --, therefor.

Signed and Sealed this
Thirteenth Day of October, 2015

Michelle K. Lee
*Director of the United States Patent and Trademark Office*